United States Patent [19]

Solomon

[11] 4,360,252
[45] Nov. 23, 1982

[54] EYEGLASS FRAME HAVING REMOVABLE LENS

[75] Inventor: Charles I. Solomon, San Antonio, Tex.

[73] Assignee: Sol-Optics, Inc., San Antonio, Tex.

[21] Appl. No.: 292,891

[22] Filed: Aug. 14, 1981

Related U.S. Application Data

[63] Continuation-in-part of Ser. No. 189,229, Sep. 22, 1980, which is a continuation-in-part of Ser. No. 124,541, Feb. 25, 1980, Pat. No. 4,304,469.

[51] Int. Cl.³ ............................................. G02C 1/08
[52] U.S. Cl. ....................................... 351/95; 351/90
[58] Field of Search .................................. 351/90–99; 2/442, 443

[56] References Cited

U.S. PATENT DOCUMENTS 2,380,281 7/1945 Whipple ................................ 351/98
2,652,746 9/1953 Shanks .
2,738,709 3/1956 Matthews et al. .
3,427,098 2/1969 Johnson .
4,176,921 12/1979 Matthias ............................... 351/106

FOREIGN PATENT DOCUMENTS 1015976 10/1952 France ................................... 351/95

Primary Examiner—John K. Corbin
Assistant Examiner—Rodney B. Bovernick
Attorney, Agent, or Firm—Gunn, Lee & Jackson

[57] ABSTRACT

An eyeglass frame having removable lenses comprising of lens rings which are split into an upper and lower ring portion. Interposed between the upper and lower ring portions, and forming an integral part of the frame are positive actuating means to force open or draw closed the split lens rings to facilitate insertion and removal of lens. Several species of eyeglass frame are visualized. The preferred species utilizes a turnbuckle arrangement or a coupling post. Other species visualized are torsional spring action closure, helical spring action, and double loop retention.

8 Claims, 11 Drawing Figures

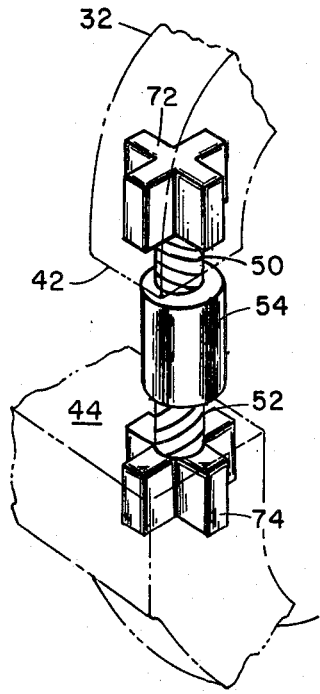
FIG. 4
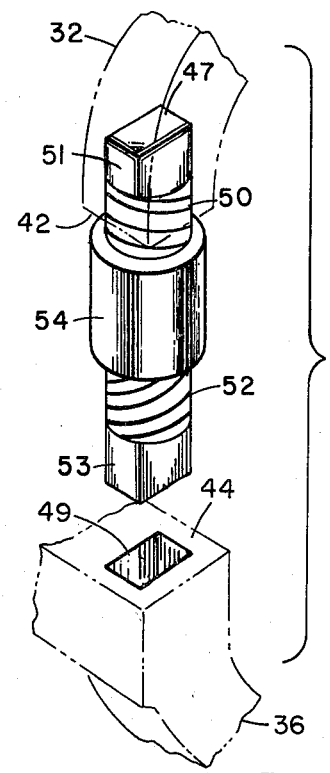
FIG. 5
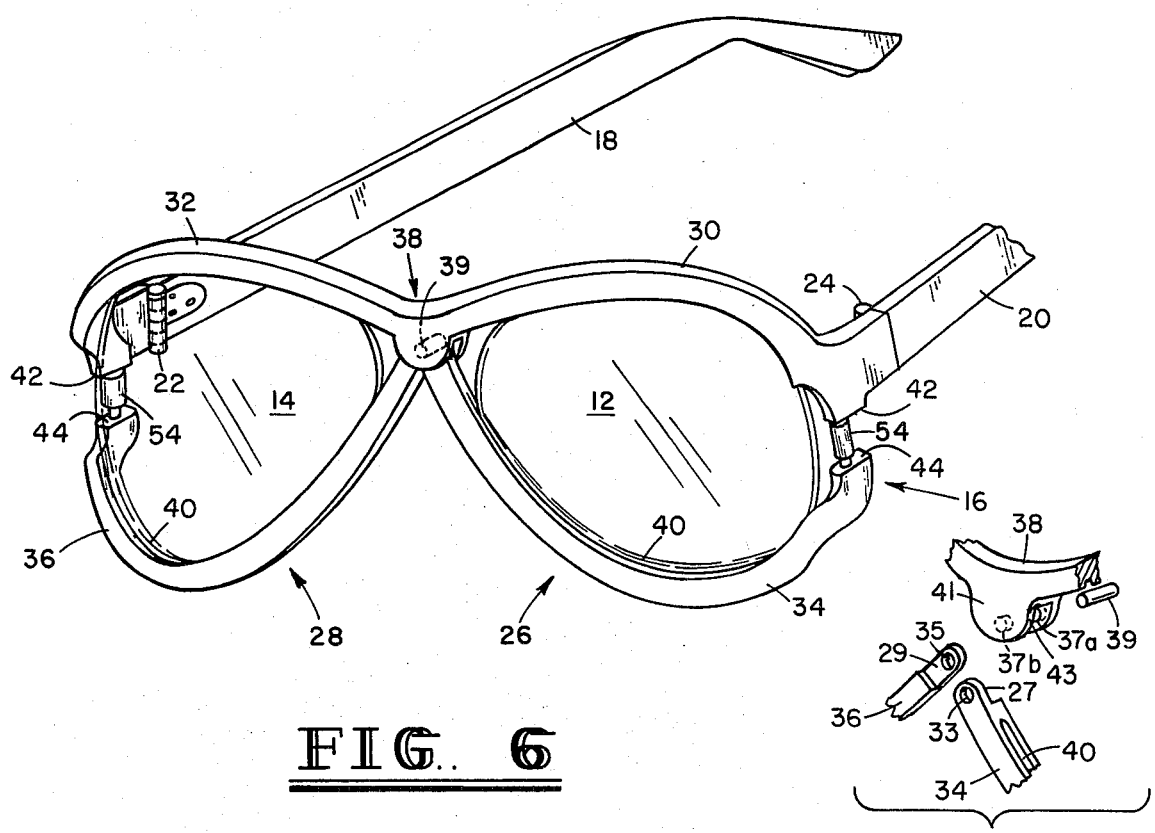
FIG. 6
FIG. 6a

EYEGLASS FRAME HAVING REMOVABLE LENS

CROSS-REFERENCE TO RELATED APPLICATIONS

This application is a continuation-in-part of U.S. patent application Ser. No. 189,229 filed on Sept. 22, 1980, entitled "Eyeglass Frames Having Removable Lens", which application is a continuation-in-part of U.S. patent application Ser. No. 124,541 now U.S. Pat. No. 4,304,469 filed Feb. 25, 1980, entitled "Eyeglass Frames Having Removable Lens", both of which are hereby incorporated by reference.

BACKGROUND OF THE INVENTION

This invention pertains to and is concerned with an eyeglasses frame with detachably mounted lenses, and is particularly concerned with an eyeglasses frame wherein the lenses may be detachably mounted in the frame lenses for quick and easy interchange. The eyeglass frames of this invention primarily are intended for utilization with lenses of various types for the prescription, non-prescription, safety glasses, or sunglasses. The eyeglass frames are constructed in a rather conventional manner insofar as lens and temple members are concerned. The modification resides in the manner of securing the lenses within the lens ring. The lens rings are of a split-ring type construction wherein the upper and lower portions of the lens ring may be separated slightly to facilitate removal of lenses and then drawn together to secure the changed lenses in the lens ring. The opening and closing means utilized in the split-ring construction of the lens rings is constructed in a variety of configurations.

DESCRIPTION OF THE PRIOR ART

The most closely related patent, to the knowledge of the applicant, is the recent patent to Matthias, U.S. Pat. No. 4,176,921. The Matthias patent employs a conventional construction of lens rings and lens hooks. The Matthias patent utilizes a retaining clip mounted on the nose bridge with the clip tilting from a recessed position releasing the lenses to a closed position retaining the lenses. The distinction in the design of the present invention over the Matthias invention is the split ring construction whereby the lenses are released or retained.

The following patents relating to eyeglass frames with detachably mounted lenses are cited for the examiner's reference, but do not read on or anticipate the invention of the device herein disclosed:

(a) U.S. Pat. No. 3,427,098 to D. L. Johnston;
(b) U.S. Pat. No. 2,738,709 to R. C. Matthews, et al.;
(c) U.S. Pat. No. 2,652,746 to R. R. Shanks; and
(d) U.S. Pat. No. 1,308,477 to W. N. Blanchard.

In U.S. Pat. No. 1,308,477 to Blanchard, reference is made to a means for removably retaining lenses in welding goggles within eye cups wherein one side of the eye cup has formed therein a longitudinal opening or slot; however, this longitudinal opening or slot is not increased in width at any time in order to facilitate removal of the goggle lenses. The distinction in the design of the present invention over the Blanchard invention is the variation in the opening and closing means whereby the eyeglass lenses are released or retained.

SUMMARY OF THE INVENTION

The eyeglass frames having removable lenses incorporated in the invention of this disclosure utilize eyeglass frames of a split-ring construction having conventional temple pieces. The frame includes a pair of lens mounting rings joined by a bridging portion, which serves as a portion of the overall lens ring. The bridging portion also maintains the lenses mounted in each of the rings in spaced relation to each other for proper disposition in front of the wearer's eyes. The variation in the construction of the eyeglass frames of this invention resides primarily in the manner of securing the eyeglass lenses to the lens rings. Interposed somewhere along the continuum of each of the lens rings and an integral portion of the frame is at least one positive actuating means for facilitating opening and closing of the split-ring lens rings. As the positive activating means is loosened or tightened, the lens rings are forced open or drawn closed to facilitate the removable or insertion of interchangable eyeglass lenses.

Various configurations for imparting the necessary tension to retain the lenses within the rings are disclosed.

BRIEF DESCRIPTION OF THE DRAWINGS

For a detailed description of the construction of the eyeglass frame having removable lenses of this inventive concept, reference is made to the attached drawings wherein the construction of the preferred species and related species are illustrated and will be described in the following detailed description.

FIG. 4 is a partial perspective of an alternative embodiment of the invention of FIG. 1.

FIG. 5 is a partial perspective of still another embodiment of the invention of FIG. 1.

FIG. 6 is a front perspective view of a pair of eyeglasses showing an alternative embodiment of the invention.

FIG. 6a shows, in detail, a part of the embodiment of FIG. 6.

DETAILED DESCRIPTION OF THE PREFERRED EMBODIMENT

Figure 1:
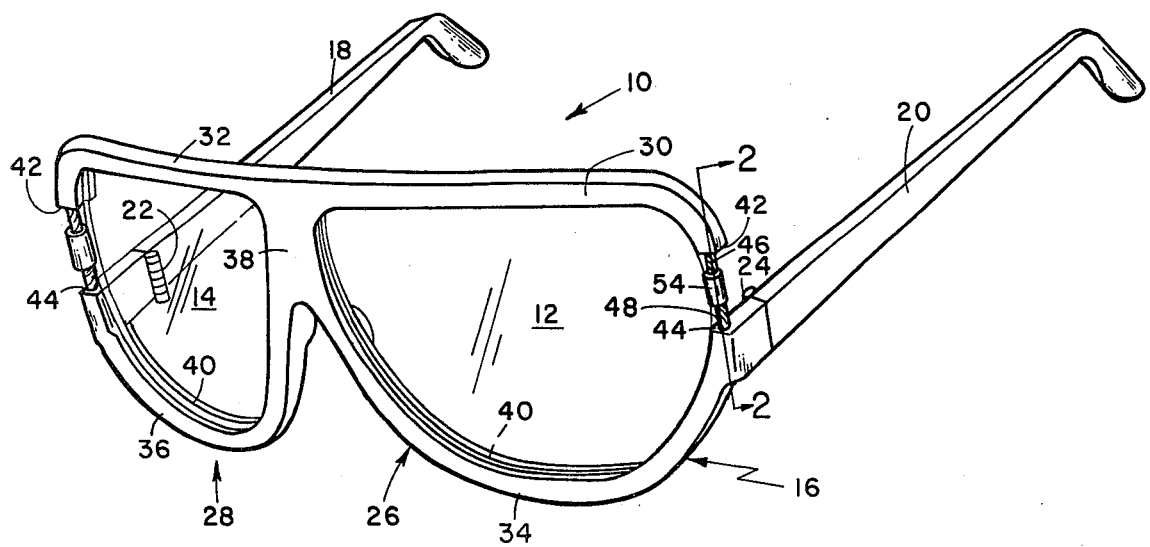
FIG. 1 is a front perspective view of a pair of eyeglasses employing the invention.

For a detailed description of the preferred embodiment and the various species, reference is made to the attached several views wherein identical reference characters will be utilized to refer to identical or equivalent components throughout the various views and the following description.

Referring now to FIG. 1, a pair of eyeglasses 10 includes lenses 12 and 14, a frame 16, and temple pieces 18 and 20. Each of the temple pieces 18 and 20 is attached to the frame 16 by means of temple attachment or hinge portions 22 and 24, these being of conventional design. The frame 16 includes an integral pair of lens mounting rings 26 and 28, each having an upper 30 and 32 and lower 34 and 36 portion joined by a bridging portion 38. The frame 16 maintains the eyeglass lenses 12 and 14 mounted in each of the ring portions 26 and 28 in a spaced relation to each other for proper disposition in front of the wearer's eyes. The lens mounting rings 26 and 28 have a groove 40 around the inner side thereof in which the outer edge of the lens 12 or 14 are disposed and held. Each ring 26 and 28 is split at at least one point along the ring forming an upper ring portion end 42 and a lower ring portion end 44. An aperture 46 and 48 is axially bored within the rings at each of the ring portions ends 42 and 44.

Figure 2:
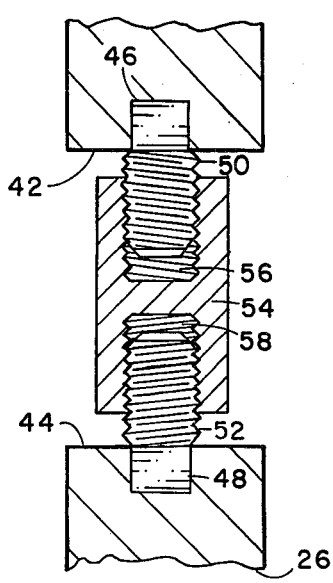
FIG. 2 is a partial cross-section of FIG. 1 along section line 2—2 showing the lug embodiment of the invention.

Referring to FIG. 2 for a more detailed disclosure of the split ring 26, lugs 50 and 52 are secured within the apertures 46 and 48, respectively. One lug 50 is threaded in one direction, while the other lug 56 is threaded in the other direction. A coupling member 54 having appropriately threaded orifices 56 and 58 at opposite ends is screwed onto each of the opposing lugs 50 and 52. The lug and coupling arrangement is similar to that of a turnbuckle. As the coupling 54 is rotated in one direction, the lug members 50 and 52 are forced apart causing the split ring 26 to open. As the split ring 26 opens and upper ring portion end 42 moves away from lower ring portion 44, the eyeglass lenses may be removed or inserted. Turning the coupling member 54 in the opposite direction brings the lugs 50 and 52 closer together, tightening the split ring 26 around the outer edge of the lens 12 therein disposed and held.

Figure 3:
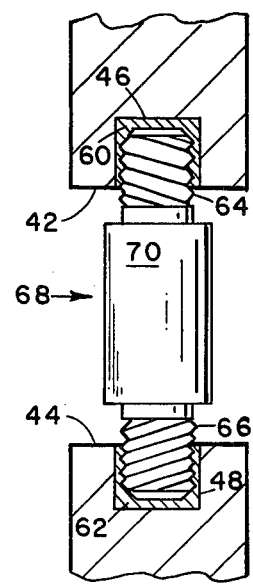
FIG. 3 is a partial cross-section of FIG. 1 along section line 2—2 showing the threaded bushing and coupling port arrangement.

FIG. 3 shows an alternate embodiment of the invention wherein the apertures 46 and 48 in the upper and lower ring portions ends 42 and 44, respectively, have inserted therein threaded bushings 60 and 62, respectively, for receiving the threaded male portion 64 and 66, respectively, of a coupling post 68. The coupling post 68 has an enlarged center portion 70 to facilitate turning of the post 68 as the threaded male ends 64 and 66 engage the threaded bushings 60 and 62, respectively, secured within the ring portion ends 42 and 44, respectively.

As can be seen in FIG. 4, the threaded lugs 50 and 52 may have X-shaped ends 72 and 74 embedded within the ring portion ends 42 and 44, respectively, reducing the possibilities of the lugs 50 and 52 turning within the apertures 46 and 48 (shown in FIGS. 2 and 3) as the coupling member 54 is rotated. Similarly, the bushings 60 and 62 shown in FIG. 3 may be of multifaced construction to reduce the possibility of the bushings 60 and 62 turning within the apertures 46 and 48 as the coupling post 68 is rotated.

FIG. 5 illustrates lug members 50 and 52 having unthreaded rectangular end portions 51 and 53 which engage rectangular apertures 47 and 49, respectively. As coupling 54 is rotated in one direction, the lug members 50 and 52 are forced apart causing the split ring portions ends 42 and 44 to open. Turning the coupling member in the opposite direction brings the lug members 50 and 52 closer together. Rectangular end portions 51 and 53 being engaged in rectangular aperture 47 and 49 results in a reduced likelihood of lug members 50 and 52 rotating within rectangular apertures 47 and 49 when coupling 54 is overtightened.

FIG. 6 shows another embodiment of the invention wherein the lower portions 34 and 36 of the rings 26 and 28 pivot about the nose bridge 38 as the coupling 54 (or post 68 device heretofore described) is opened and closed to facilitate insertion or removal of the eyeglass lens 12 and 14. The upper ring portions 30 and 32 are rigid and one integral piece. As can be seen in FIG. 6a, the nose bridge 38 has a flange portion 41 having a groove 43 adapted to receive tongues 27 and 29 of lower portions 34 and 36 of rings 26 and 28, respectively. The flange portion 41 is bored at openings 37a and 37b to receive pivot pin 39. The tongues 27 and 29 are also bored at openings 33 and 35 to receive pivot pin 39. When assembled, openings 33, 35, 37a and 37b are aligned with pivot pin 39 passing through the openings providing a pivot point during opening and closing of the frames. It is envisioned that the embodiment incorporating the pivot about the nose bridge 38 would be utilized in eyeglass frames of more rigid construction, e.g., metal or metal alloy materials, to reduce the stress caused by frequent opening of the split rings 26 and 28.

Figure 7:
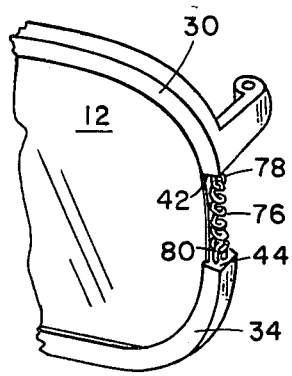
FIG. 7 is a partial perspective of an alternative embodiment of the invention shown in FIGS. 1 and 6.
Figure 8:
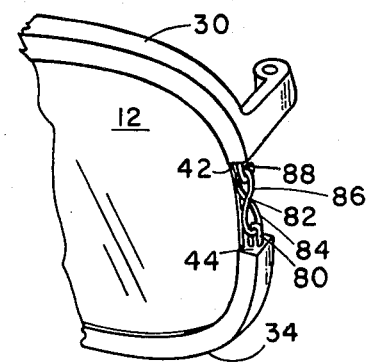
FIG. 8 is a partial perspective of an alternative embodiment of the invention shown in FIGS. 1 and 6.

FIGS. 7 and 8 show alternate embodiments of the device disclosed in FIG. 1 wherein the coupling 54 or post 68 has been replaced by other fastening means. In FIG. 7, a coil-spring or helical spring-type arrangement 76 joins the upper portion of the eyeglass ring 30 with the lower portion of the eyeglass ring 32 when attached to oppositely aligned hooks 78 and 80. The hooks 78 and 80 are secured by any known means into the upper and lower ring portion ends 42 and 44. FIG. 8 shows a double loop fastening means 82 where the lower loop 84 of the fastening means is securely attached to a hook 80 fixed in the lower ring portion end 44, while the upper loop 86 of the fastening means latches over an open J-hook 88 which is securely affixed to the upper ring portion end 42.

Figure 9:
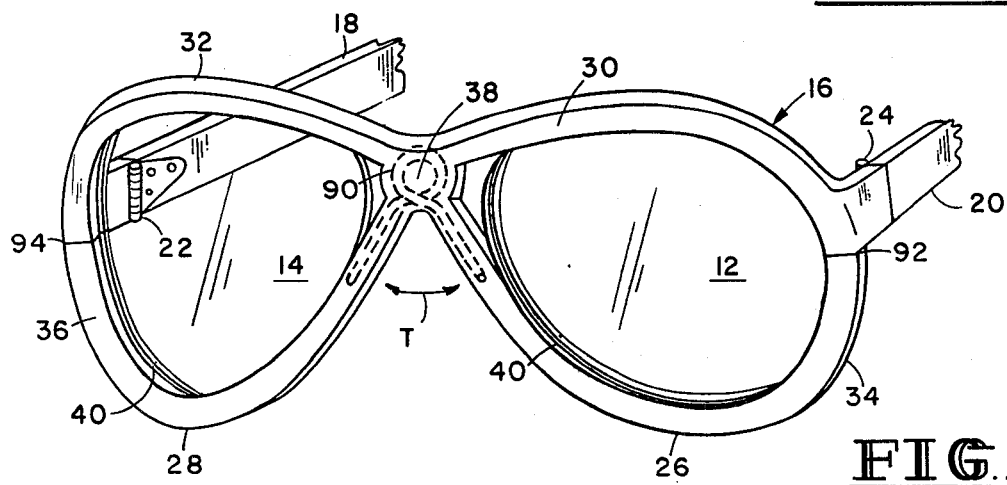
FIG. 9 is a front perspective of still yet another embodiment of the invention.

Another embodiment can be seen in FIG. 9. In this embodiment, the split rings 26 and 28 are held in the closed position by means of a mechanical spring 90 located at the junction of the nose bridge 38 and upper portions 30 and 32 of eyeglass frame 16. The spring 90 in the preferred embodiment is molded into the frame 16 during construction; however, the applicant envisions that any number of equivalent methods of incorporating a mechanical spring into the nose bridge 38 may be used.

The spring 90 is constructed such that in its released position, tension T forces the lower ring portions 34 and 36 of the eyeglass frame 16 to be forced upward towards the upper ring portions 30 and 32 of the eyeglass frame 16 closing the splits 92 and 94, and tightening the split rims 26 and 28 around the outer edge of the lenses 12 and 14 therein disposed and held. An example of such mechanical spring 90 is a torsional spring used in the familiar mouse trap. Exerting a downward force on the lower portions 34 and 36 of the ring causes the spring 90 to go into compression allowing the lenses 12 and 14 to be removed from, or inserted in, the groove 40 in the rings 26 and 28. In all of the embodiments heretofore discussed, removal of one lens from one of the lens ring pairs has no effect upon the orientation or position of the adjacent lens. As has been discussed, one lens can be removed for interchange or replacement without affecting the other lens.

Figure 10:
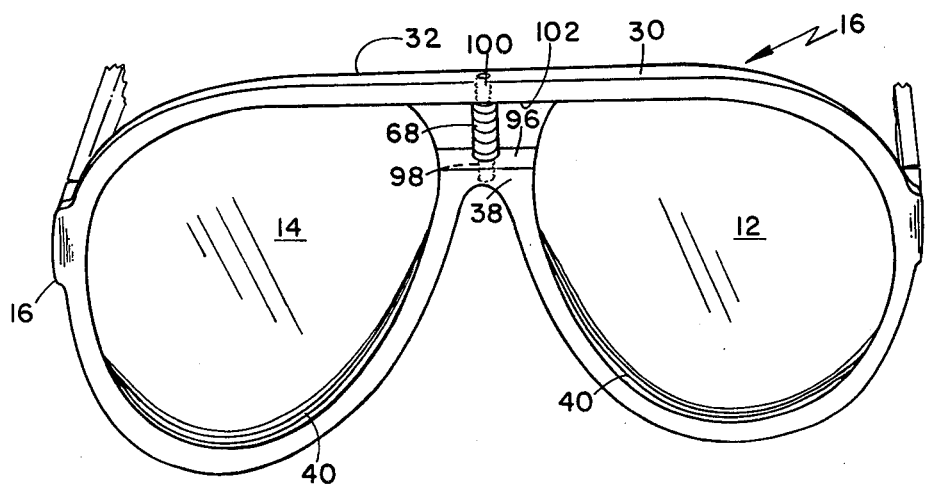
FIG. 10 is a perspective view of another embodiment of the invention.

FIG. 10 illustrates still yet another embodiment of the present device. FIG. 10 discloses placing the post 68 perpendicularly at the intersection of the nose bridge 38 and the upper portions 30 and 32 of the eyeglass frame 16. For example, the top of the nose bridge 96 is bored 98 to accept the threaded bushing 62 indicated in FIG. 3 (or the lug 52 disclosed in FIG. 2). Alternatively, the post 68 may be threaded directly into the frame 16, especially in metal frames. Opposite bore 98 and axially aligned thereto, a second bore 100 is made in the bottom side 102 of the upper portions 30 and 32 of the eyeglass rings. The second bore 100 is adapted to receive a threaded bushing 60 similar to that disclosed in FIG. 3 (or a threaded lug 50 as disclosed in FIG. 2). In the embodiment where the threaded bushings 60 and 62 are inserted in the bores 98 and 100, a threaded post coupling 68 similar to that disclosed in FIG. 3 may be screwed into the threaded bushings 60 and 62 joining the nose bridge 38 with the upper portions 30 and 32 of the eyeglass frame 16.

Turning the post 68 (or coupling 54 depending upon which embodiment is being used) in one direction causes the nose bridge 38 and upper portions 30 and 32 of the ring to move apart facilitating the removal or insertion of the lens 12 and 14 from the grooves 40 in the rings 26 and 28. Turning the post 68 (or coupling 54) in the opposite direction brings the nose bridge 38 and upper portions 30 and 32 of the frame closer together tightening the rings 26 and 28 around the lens 12 and 14, which have been inserted in the grooves 40.

I claim:

1. An eyeglass frame adapted to receive removable lens comprising:
    a. a pair of split lens rings connected by a nose bridge, said split lens rings adapted to receive and retain eyeglass lenses;
    b. temple means secured to each of said lens rings;
    c. at least one turnbuckle connected to said pair of split lens rings for opening and closing said split in said split lens rings to allow said eyeglass lenses to be retained or removed from said split lens rings, said turnbuckle forming an integral part of said split rings and capable of being loosened or tightened by hand without the aid of a separate instrument.

2. The eyeglass frame of claim 1 wherein said turnbuckle is disposed at the junction of said nose bridge and said pair of split lens rings.

3. The eyeglass frame of claim 1 wherein said turnbuckle is fixedly secured within said split lens ring by multifaced anchor means.

4. The eyeglass frame of claim 1 wherein each of said split lens rings are split to form an upper ring portion and a lower ring portion relative to said nose bridge, said turnbuckle being disposed at the junction of said upper and lower ring portions.

5. The eyeglass frame of claim 2 wherein each of said split lens rings are split to form an upper ring portion and a lower ring portion relative to said nose bridge.

6. An eyeglass frame adapted to receive removable lens comprising:
    a. a pair of split lens rings connected by a nose bridge, said split lens rings adapted to receive and retain eyeglass lenses;
    b. temple means secured to each of said lens rings;
    c. a jacking post disposed perpendicularly between said nose bridge and an upper portion of said eyeglass frame, said jacking post threaded into said nose bridge and said upper portion of said eyeglass frame enabling said split lens rings to be opened or closed upon turning said jacking post, said jacking post capable of being loosened or tightened by hand without the aid of a separate instrument.

7. An eyeglass frame adapted to receive removable lens comprising:
    a. a pair of split lens rings connected by a nose bridge, said split lens rings adapted to receive and retain eyeglass lenses;
    b. temple means secured to each of said lens rings;
    c. at least one positive actuating means connected to said pair of split lens rings for opening and closing said split in said split lens rings to allow said eyeglass lenses to be retained or removed from said split lens rings, wherein said positive actuating means forms an integral part of said split rings and comprises a rod having oppositely threaded ends thereon, said rod being shaped so as to be capable of being loosened or tightened by hand and threaded bushings securely affixed within said split lens ring for receiving said rod.

8. The eyeglass frame of claim 4 further comprising means for pivoting said lower ring portion of each lens ring about said nose bridge as said turnbuckle is loosened or tightened.

* * * * *